United States Patent
Hartwig et al.

(10) Patent No.: US 11,199,312 B2
(45) Date of Patent: Dec. 14, 2021

(54) LIGHTING DEVICE FOR TEXTILES COMPRISING A LIGHTING MODULE FOR OPTICAL WAVEGUIDES

(71) Applicant: OSRAM GmbH, Munich (DE)

(72) Inventors: Ulrich Hartwig, Berlin (DE); Markus Stange, Berlin (DE); Thorsten Klebba, Berlin (DE); Werner Stolzenberg, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 17/031,972

(22) Filed: Sep. 25, 2020

(65) Prior Publication Data

US 2021/0095836 A1    Apr. 1, 2021

(30) Foreign Application Priority Data

Sep. 26, 2019   (DE) .................. 10 2019 214 762.3

(51) Int. Cl.
   *F21V 17/16*   (2006.01)
   *F21V 8/00*    (2006.01)
   *F21V 21/08*   (2006.01)
   *G02B 6/42*    (2006.01)

(52) U.S. Cl.
   CPC .............. *F21V 17/16* (2013.01); *F21V 21/08* (2013.01); *G02B 6/0005* (2013.01); *G02B 6/4292* (2013.01)

(58) Field of Classification Search
   CPC .. G02B 6/0005; G02B 6/0006; G02B 6/4292; F21V 17/16
   See application file for complete search history.

(56) References Cited

U.S. PATENT DOCUMENTS 3,624,385 A * 11/1971 Wall ................. F21S 4/10
                                                 362/565
8,142,061 B2 * 3/2012 Jablonski .......... G09F 21/02
                                                 362/559

FOREIGN PATENT DOCUMENTS

| CN | 105114916 A | 12/2015 |
| DE | 100 65 007 A1 | 2/2002 |
| WO | 2019/072530 A1 | 4/2019 |

* cited by examiner

*Primary Examiner* — Robert J May
(74) *Attorney, Agent, or Firm* — DLA Piper LLP (US)

(57) ABSTRACT

A lighting device that illuminates textiles by optical waveguides includes a body that receives the optical waveguide; a clamping device for the received optical waveguide; and a lighting module, wherein the lighting module is arranged within the body to enable light emitted by the lighting module during operation to be coupled into the optical waveguide, and the clamping device is adapted to repeatedly clamp and release the optical waveguide.

17 Claims, 19 Drawing Sheets

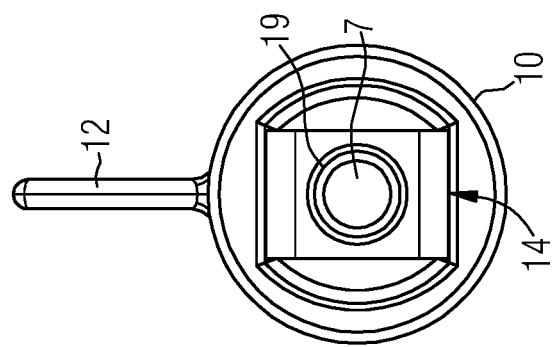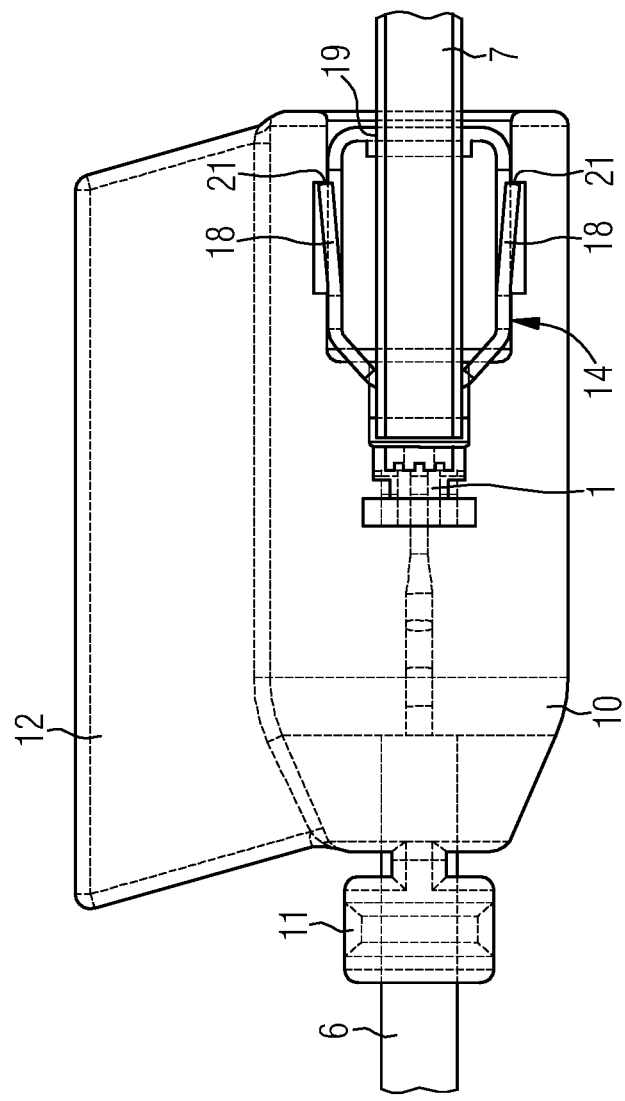

LIGHTING DEVICE FOR TEXTILES COMPRISING A LIGHTING MODULE FOR OPTICAL WAVEGUIDES

TECHNICAL FIELD

This disclosure relates to a lighting device for the illumination of textiles by optical waveguides.

BACKGROUND

Textiles, in particular, for example, high-visibility jackets, rain jackets or other garments but also textile or partly textile accessories such as helmets or bags, in particular also schoolbags, can be equipped with lighting functions, for example, to increase the visibility of persons wearing such textiles both during the day and at night. For this purpose, light sources are integrated into the textiles, which light sources, for example, provide a signal light or increase safety by various illumination patterns.

WO 2019072530 A1 discloses a lighting device for the illumination of textiles by optical waveguides. An optical waveguide is connected to a molded housing enclosing at least one light source. However, the optical waveguide cannot straightforwardly be released from the respective molded housing and connected again.

It could therefore be helpful to provide a lighting device for textiles comprising a lighting module from which an optical waveguide can be repeatedly released and connected, a lighting module that can be protected against moisture, and can be manufactured and mounted and demounted in a cost-effective and simple manner, that is to say in particular to comprise as few parts as possible.

SUMMARY

We provide a lighting device that illuminates textiles by optical waveguides including a body that receives the optical waveguide, a clamping device for the received optical waveguide, and a lighting module, wherein the lighting module is arranged within the body to enable light emitted by the lighting module during operation to be coupled into the optical waveguide, and the clamping device is adapted to repeatedly clamp and release the optical waveguide.

We also provide a textile including the lighting device that illuminates textiles by optical waveguides including a body that received the optical waveguide, a clamping device for the received optical waveguide, and a lighting module, wherein the lighting module is arranged within the body to enable light emitted by the lighting module during operation to be coupled into the optical waveguide, and the clamping device is adapted to repeatedly clamp and release the optical waveguide.

We further provide a method of repeatedly clamping and releasing an optical waveguide in the lighting device that illuminates textiles by optical waveguides including a body that received the optical waveguide, a clamping device for the received optical waveguide, and a lighting module, wherein the lighting module is arranged within the body to enable light emitted by the lighting module during operation to be coupled into the optical waveguide, and the clamping device is adapted to repeatedly clamp and release the optical waveguide, including inserting an optical waveguide into the body of the lighting device, whereupon the clamping device clamps the optical waveguide with the aid of the clamping elements and inherent forces acting thereon, and applying an external force action to the body of the lighting device in a targeted manner such that the clamping elements are released and free the optical waveguide.

BRIEF DESCRIPTION OF THE DRAWINGS

FIGS. 13A, 13B show a schematic illustration of a lighting device with the collet shown in FIGS. 11A, 11B and 12A, 12b, respectively, in a side view and a front view, respectively.

LIST OF REFERENCE SIGNS

Figure 1:
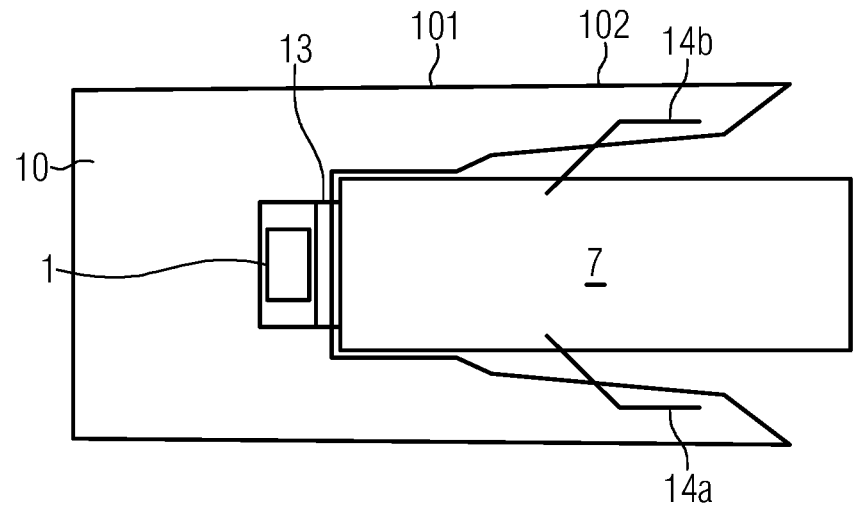
FIG. 1 shows a schematic illustration of a lighting device in accordance with one example with a closed clamping device for an optical waveguide.

1 Light source/LED
2a,b Solder
3 Printed Circuit Board (PCB)
4a,b Stranded conductor wire
5a,b Insulation
6 Cable sheath
7 Optical waveguide
8 Core (optical waveguide)
9 Cladding (optical waveguide)
10 Body (of the lighting device)
101 Receiving section
102 Clamping section
11 Anti-kink protection
12 Sew-on strap
121 Textile
13 Seal
14 Collet
14a,b Collet element
15 Clamping region
151 Cutout (in the clamping region)
16 Cutout
17 Angular section
18 Body spring clamps
19 Optical waveguide guide
20 Optical waveguide sleeve
21 Undercut
22 Optical waveguide clamps
23 Inlay sleeve stops
24 Inlay sleeve
25 Inlay sleeve legs
251 Slot
26 Inlay sleeve stop cutout
27 Guide groove
28 Grid grooves
29 Guide web
30 Body catches
31 Expanding groove

DETAILED DESCRIPTION

We provide a lighting device comprising a body for receiving an optical waveguide, a lighting module and a clamping device for repeatedly releasably clamping the optical waveguide. The body has an opening into which an optical waveguide can be inserted and received in a repeatedly releasably clamping manner with the aid of the clamping device. In this example, the lighting module is arranged within the body such that a received optical waveguide is assigned to the lighting module and coupled such that the light from the lighting module radiates into the optical waveguide. This arrangement of lighting module and opening for receiving an optical waveguide defines a longitudinal axis of the body.

The optical waveguide can be, for example, a single optical fiber or a plurality of optical fibers or an optical fiber bundle.

The lighting device is additionally attachable to a textile. The optical waveguide emits the light, in particular uniformly, by way of its surface. In this example, the light preferably emerges at at least one or the longitudinal sides of the optical waveguide and thus enables visibility of the textile, for example, of a garment. Multiple reflection can additionally occur at the inner walls of the optical waveguide.

The lighting module comprises at least one light source, in particular a light-emitting semiconductor component, for example, an LED, OLED or laser diode. Moreover, the lighting module can also comprise further optical and/or electronic components, for example, driver electronics for driving the light source. The lighting module can be connected to an energy supply arranged within or outside the lighting device.

Optical elements can be provided between light source and optical waveguide to improve coupling of the light into the optical waveguide. Possible optical units are, for example: optical scatterers, lenses, white scattering surfaces (white chamber), light guiding rods (straight or tapered, round or polygonal cross section), CPCs (Compound Parabolic Concentrator), reflectors, light refracting gratings, fly's eye condensers or a combination thereof.

The body of the lighting device and/or the clamping device clamps the inserted and received optical waveguide, without external force action on the body and/or on the clamping device, in the coupling position and thus prevents the optical waveguide from being unintentionally released. In other words, the body and/or the clamping device themselves/itself applies the force for the clamping of the optical waveguide (inherent force).

Preferably, the inherent force for the clamping is applied by the fact that the body and/or the clamping device at least partly consist/consists of an elastic or resilient material. It is only by a targeted force action on the body and/or the clamping device counter to the spring effect that the clamping is released and the optical waveguide can be removed from the clamping device. Afterward, as necessary the optical waveguide can be inserted again into the lighting device, whereupon the clamping device clamps the optical waveguide again until the optical waveguide is again released by a targeted force action and removed.

The clamping effect or the cancellation thereof can be made possible or at least facilitated by a suitable shaping of the body and/or of the clamping device. Shaping is effected such that in the rest state (that is to say without action of external forces) inherent forces, in particular elastic material forces, act on the clamping elements of the clamping device and thus bring about the clamping with the optical waveguide. By a corresponding elastic shape change by way of targeted external force action, for example, by elastic expansion of the body and/or the clamping device counter to the direction of the clamping force, the clamping elements lift off from the optical waveguide and the clamping is released. The shape change necessary for lifting off the clamping elements can also be facilitated by an expanding groove in the body, besides the suitable shaping.

To clamp the optical waveguide, the clamping device can have a collet, wherein at least two collet elements situated opposite one another clamp in the optical waveguide. The collet can be arranged as a separate component in the body of the clamping device, for example, by the collet elements being configured as bent sheet-metal parts shaped in a suitable manner.

Alternatively, the collet or generally the clamping device can at least partly also be an integral part of the body of the lighting device.

Advantageously, the body may be configured in an at least partly elastic fashion such that the clamping effect can be canceled by suitable elastic deformation of the clamping device, for example, by suitable force action on the elastic body perpendicular to the two collet elements situated opposite one another. As a result, the body and/or the clamping device expand(s) elastically such that the two collet elements move apart, i.e., the collet opens and thus frees the optical waveguide.

Figure 11A:
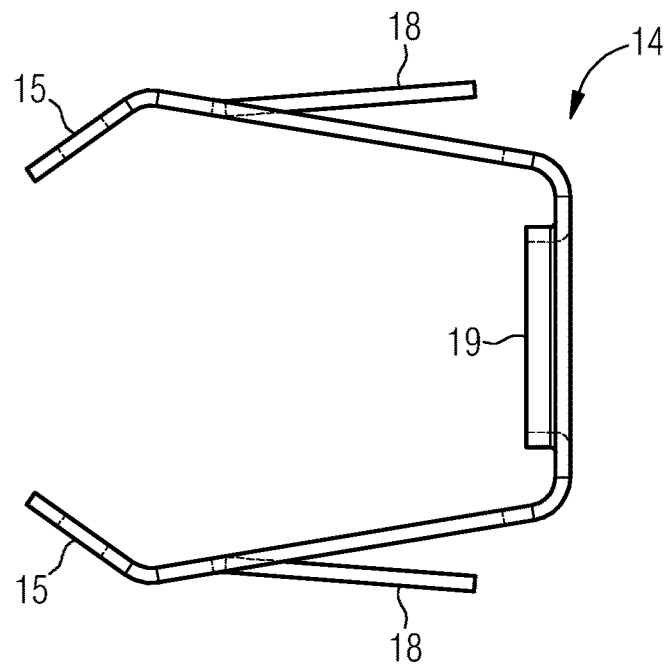
FIGS. 11A, 11B show an alternative example of a collet in an open state in a side view and a perspective view, respectively.
Figure 11B:
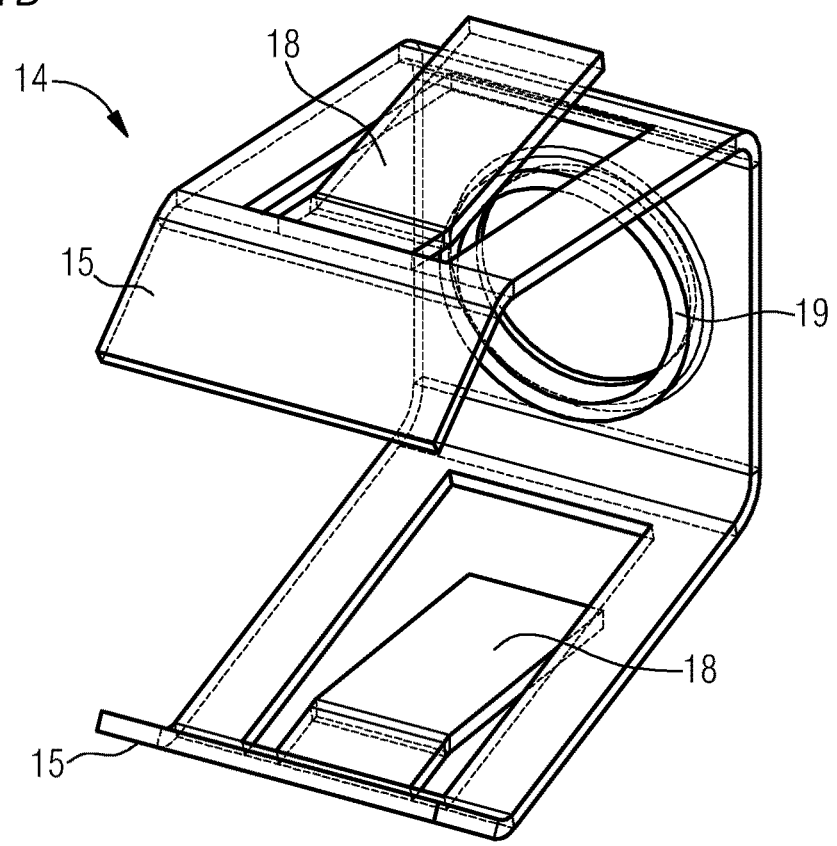
Figure 12A:
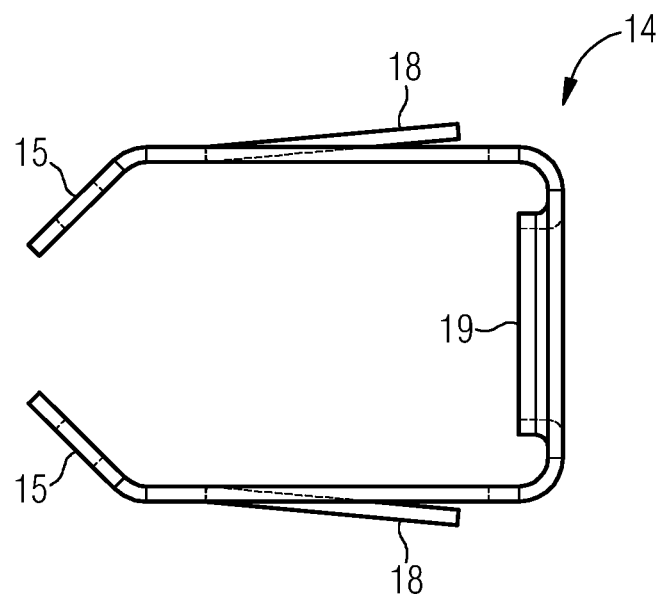
FIGS. 12A, 12B show the device of FIGS. 11A and 11B, but in a closed state.
Figure 12B:
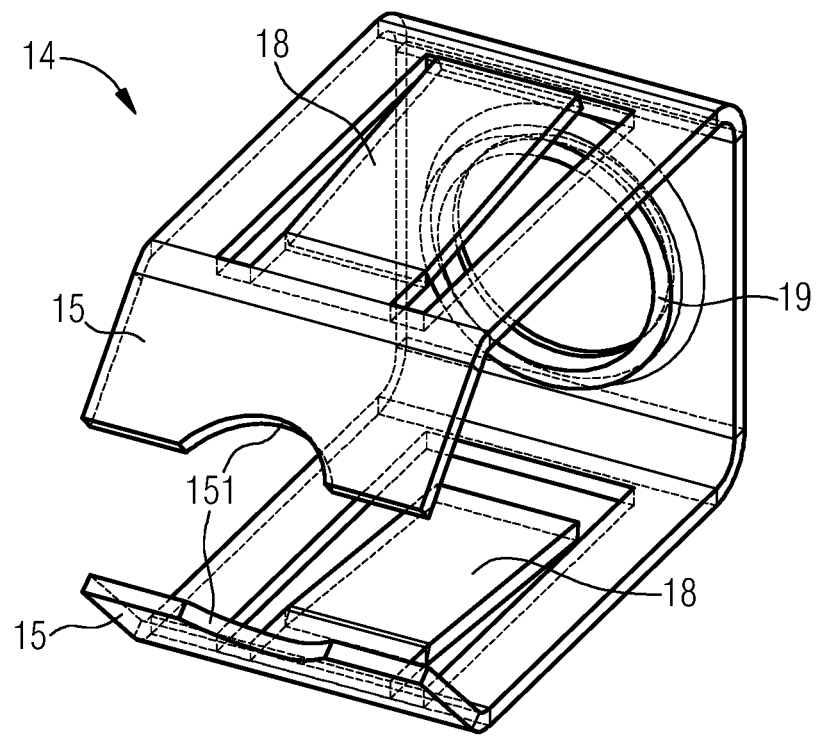

The clamping region of the collet can also be slightly angular with respect to the longitudinal axis of the body such that a screwing movement relative to the optical waveguide brings about a release of the connection between body and optical waveguide. By way of example, for this purpose, the angular position of two collet elements is such that the clamping regions of the two collet elements at least approximately imitate corresponding regions of a thread turn. Further details are shown in FIGS. 11B and 12B.

This thread turn aspect of the clamping device can also be generalized to a plurality of thread turns. For this purpose, a helix or screw thread region can be provided, which is split into two parts connected resiliently on one side along the longitudinal axis of the body. The optical waveguide can then be pushed into this thread region by the halves being expanded at their loose end. After release of the expansion, the optical waveguide is locked against withdrawal by the thread structure, but can be unscrewed from the thread region again. The screw thread region can consist of one thread turn or a plurality of thread turns.

The clamping device can also be a combination of separate and integral components. By way of example, the body can have in a clamping section a structure that clampingly cooperates with a structure of a component arranged on the optical waveguide and is repeatedly releasable and connectable.

The clamping device can also be a combination of two repeatedly releasably clamping components, wherein one component is connectable, in particular clampable, to the optical waveguide and the other component is connectable, in particular clampable, to the body. The two components can be shaped, for example, as repeatedly releasably clamping sleeves that fit into one another coaxially. In this example, the outer sleeve (body inlay sleeve, or inlay sleeve for short) is inserted into the opening in the body of the lighting device and fixedly clamped therein by clamping elements, for example, spring tongues or the like. Afterward, the optical waveguide with the inner sleeve (optical waveguide sleeve) clamped on is inserted into the outer sleeve that has been inserted. To obtain a high-tensile-strength interlacing of both sleeves in the axial direction, the sleeves can be provided with suitably intermeshing structures such as cutouts, spring clamps and the like. Preferably, the outer sleeve is shaped in cross section such that it lifts elastically off from the inner sleeve upon targeted external force action at least in the region of the interlacing and thus enables both sleeves to be axially released from one another.

Further details concerning various examples of the clamping device are found in the respective descriptions of the figures.

The lighting module, that is to say light source(s) and associated electronics, are embedded into the body of the lighting device, for example, by encapsulation by injection molding. To improve protection against moisture for the electronics and the light source(s), a seal can be provided. In this example, the seal comprising a transparent material, for example, transparent silicone can be introduced onto the light source(s) and into the body or be a sealing ring as a separate part or part of the body. In particular, the body can also concomitantly perform the function of the seal if the material for the body is transparent.

To be able to sew the lighting device into a garment or secure it releasably thereto in a simple manner, the body can have a sew-on strap or a suitable securing element, e.g., a button hole, button (snap fastener), hook and loop tape or the like.

Further advantages, features and details are evident from the following description of preferred examples, and with reference to the drawings. In the figures, identical reference signs designate features and functions that are identical or of identical type.

Figure 2:
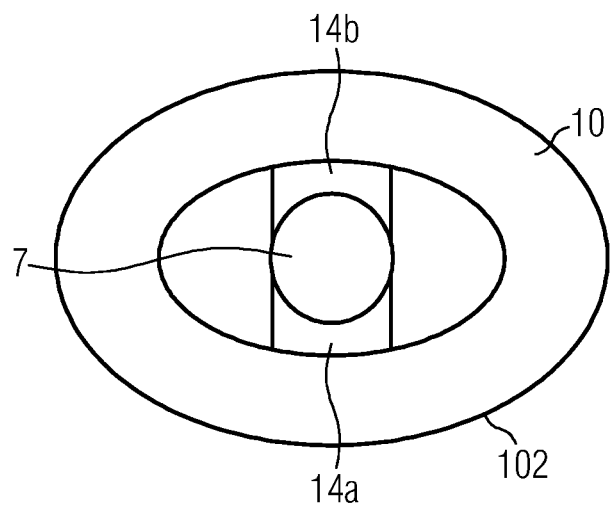
FIG. 2 shows the lighting device shown in FIG. 1 in a front view.
Figure 3:
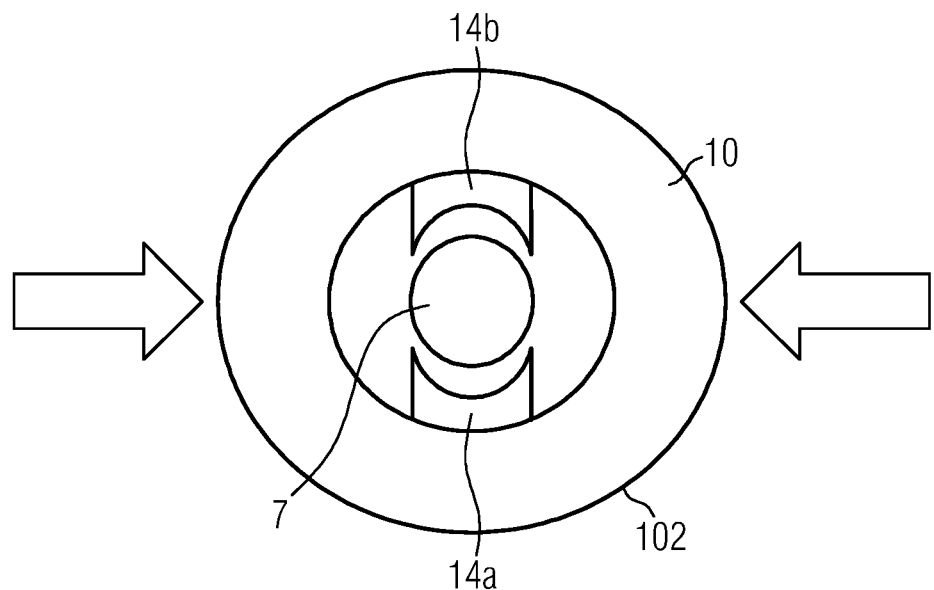
FIG. 3 includes the device of FIG. 1, but with an open clamping device for the optical waveguide.

FIGS. 1 to 3 schematically illustrate a lighting device comprising an optical waveguide 7 in accordance with one example. The simplified plan view in FIG. 1 shows the body 10 of the lighting device or clamping device. The body 10 has a light source, for example, LED 1 arranged at the end of a receiving section 101. The receiving section 101 receives the optical waveguide 7 such that the end of the optical waveguide 7 is arranged opposite the light source 1. A seal 13 seals the light source 1 visa vis the receiving region and thus protects it against moisture.

To elucidate the fundamental functioning of the clamping device, FIGS. 2 and 3 schematically illustrate the closed state and open state, respectively. In the closed state of the clamping device (that being the normal rest state without targeted external force action) the optical waveguide 7 is clamped by the clamping device. For this purpose, the body 10 consisting of an elastic material, for example, an elastomer or silicone has an oval shape in a clamping section 102 in a front view oriented perpendicular to the longitudinal axis of the optical waveguide 7 (see FIG. 2). In addition, in the clamping section 102 of the body 10, two angular collets 14a, 14b are arranged opposite one another along the smaller axis of the oval such that in the rest state they clamp the optical waveguide 7, that is to say are closed.

FIG. 3 shows the state in which a force action on both sides (symbolized by the two arrows), perpendicular to the two collets 14a, 14b, acts on the body 10 in the initially oval clamping section 102. This force action brings about a shape change in which, in the region of the clamping section 102, the body 10 deforms from the initially oval cross section to an approximately circular cross section (see FIG. 3). As a result, the body 10 expands counter to the clamping force of the collets 14a, 14b, as a result of which in turn the two collets 14a, 14b move apart and free the optical waveguide 7 (open state of the clamping device). In an alternative example (not illustrated), an originally circular shape (closed state=rest state) can also be converted to a suitably oval shape (open state) by external force action. Otherwise the functioning is as described above.

Figure 4:
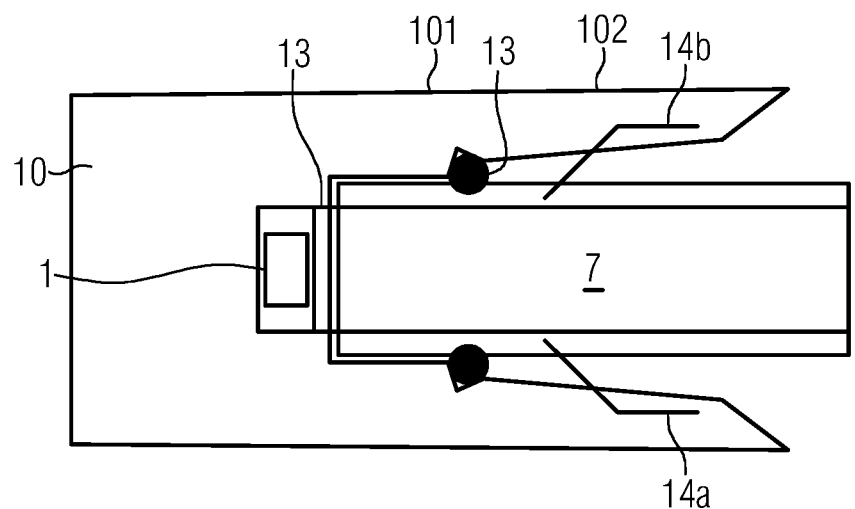
FIG. 4 shows the lighting device shown in FIG. 1 with an alternative seal.

FIG. 4 schematically illustrates the lighting device shown in FIG. 1 with an alternative seal. In this example, an O-ring 13 arranged in a groove in the transition between receiving section 101 and clamping section 102 of the body 10 fits onto the optical waveguide and seals the receiving region 101 facing the light source 1 against ingress of moisture.

Figure 5:
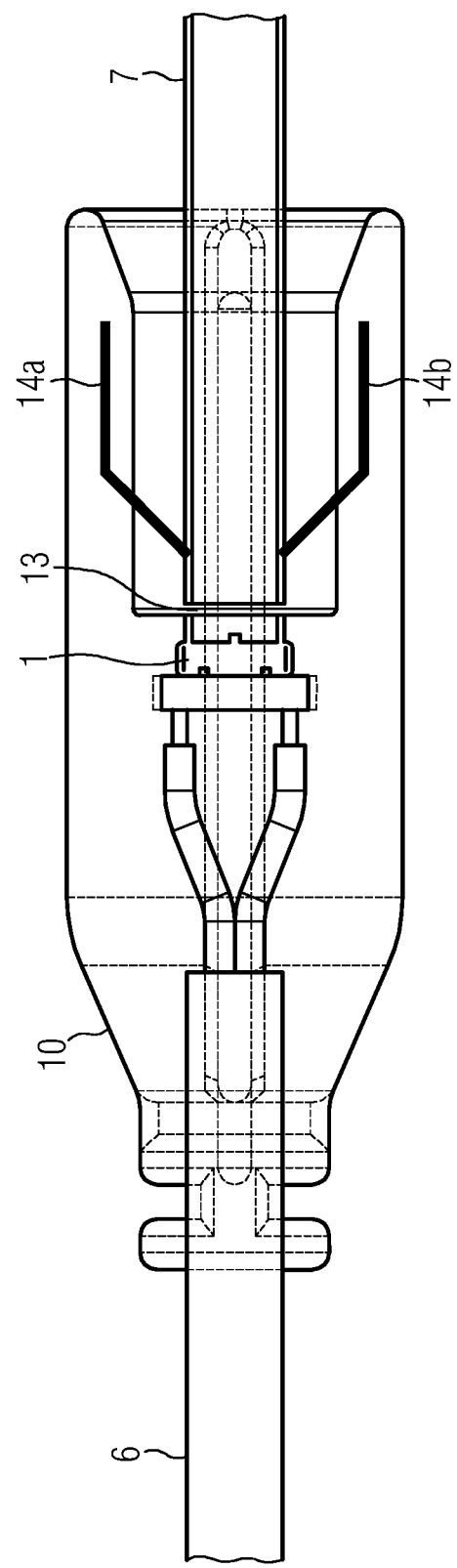
FIG. 5 shows a schematic illustration of a lighting device in accordance with a further example with a coupled optical waveguide.
Figure 6:
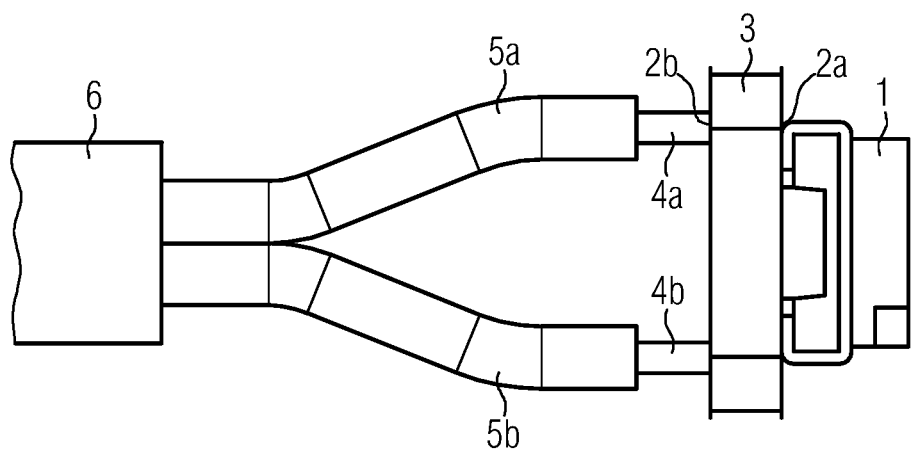
FIG. 6 shows a schematic illustration of a lighting module for the lighting device.
Figure 7:
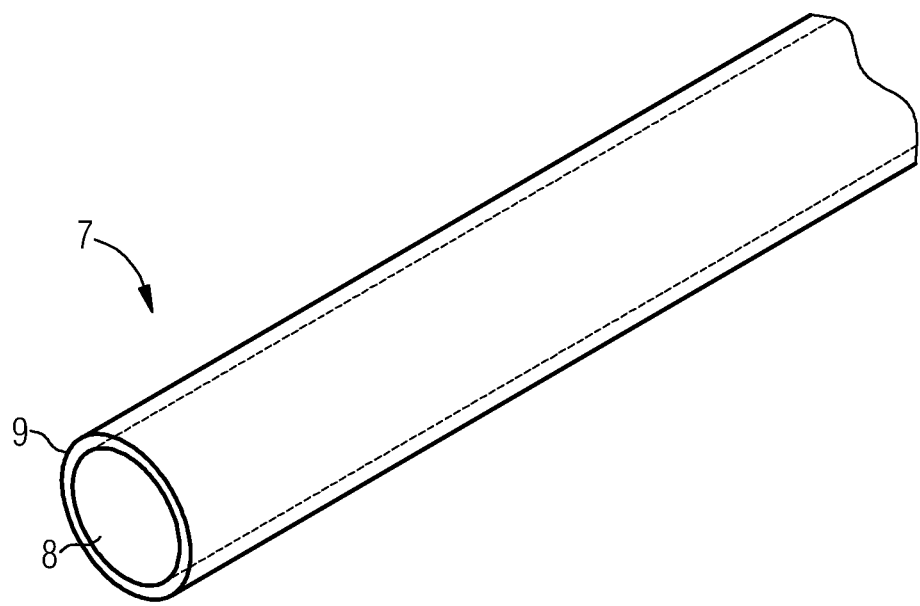
FIG. 7 shows a schematic illustration of an optical waveguide.

FIG. 5 schematically illustrates a lighting device similar to FIG. 1 in accordance with one example. In addition, the associated FIGS. 6 and 7 illustrate some details of the lighting module and of the optical waveguide 7, respectively. In the example shown in FIG. 6, the lighting module comprises an LED 1, which is soldered by a solder 2a onto a printed circuit board (PCB) 3. Further electronics, for example, LED driver, Bluetooth, microphone, microprocessor and the like can be accommodated on the PCB. The PCB is connected to two stranded conductor wires 4a, 4b by a solder 2b. The components on the PCB can thus be supplied with current. The stranded wires are furthermore each provided with electrical insulation 5a, 5b and enclosed by a cable sheath 6.

FIG. 7 shows one example of the optical waveguide 7. The optical waveguide 7 consists of a core 8, which primarily participates in the guiding of light, and a protective cladding 9. The cladding serves for mechanical protection of the core and prevents light from being coupled out of the optical waveguide as a result of touching or contaminants. Both core and cladding can have light scattering properties to couple out light in a targeted manner over the length of the optical waveguide. In principle, it is also possible to use an optical waveguide without cladding or a fiber bundle with or without cladding.

Figure 8:
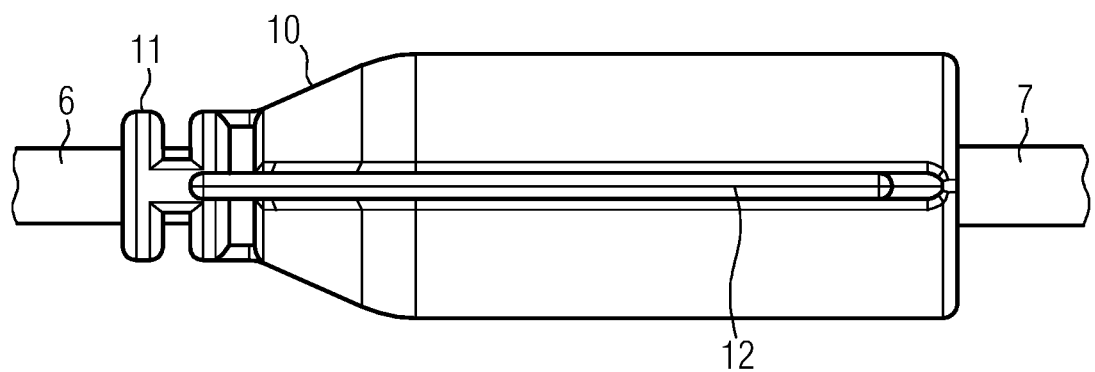
FIG. 8 shows a schematic illustration of a lighting device in accordance with a further example with a sew-on strap.
Figure 9:
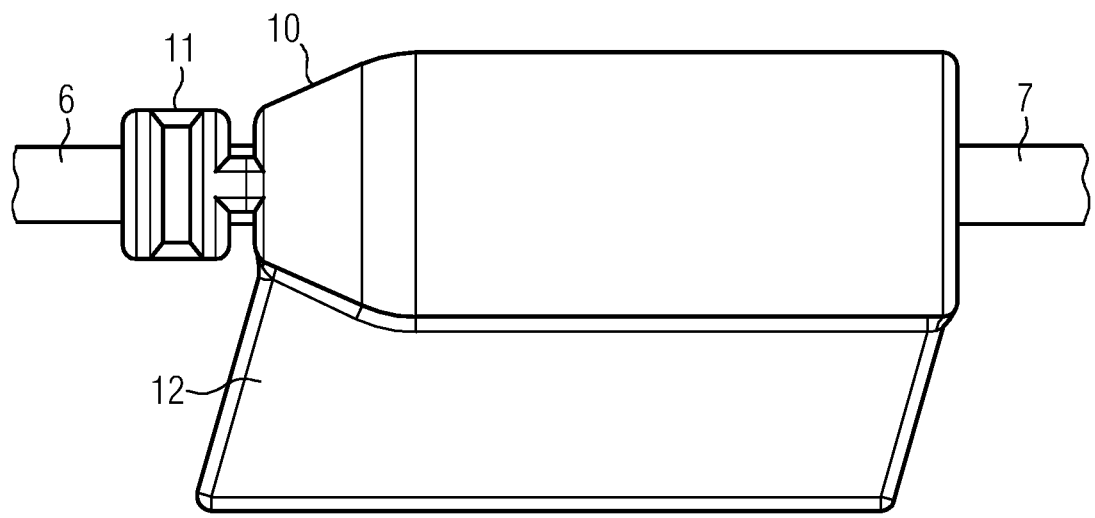
FIG. 9 shows the device of FIG. 8, but in a different view.

FIGS. 8 and 9 schematically illustrate a further example of a lighting device in two different plan views. The body 10 consists of a material having flexible properties, e.g., an injection-molded plastic, some other elastomer or silicone. Moreover, materials suitable for injection molding methods are preferred such that, for example, electronic components and ideally also collet elements can be encapsulated by injection molding. Further elements that serve for mounting these components can be obviated as a result. An anti-kink protection 11 prevents stranded conductor wires from being kinked to an excessively great extent. A sew-on strap 12 sews the body 10 into a textile, e.g., a garment. As necessary, it is possible to have further mechanical measures such as, e.g., holes, for mechanical fixing.

Figure 10A:
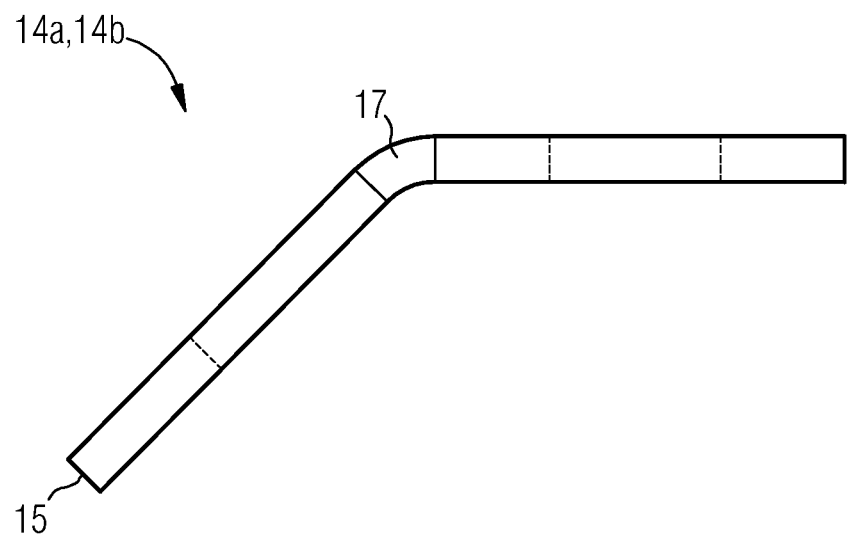
FIGS. 10A, 10B show a collet element in a side view and a perspective view, respectively.
Figure 10B:
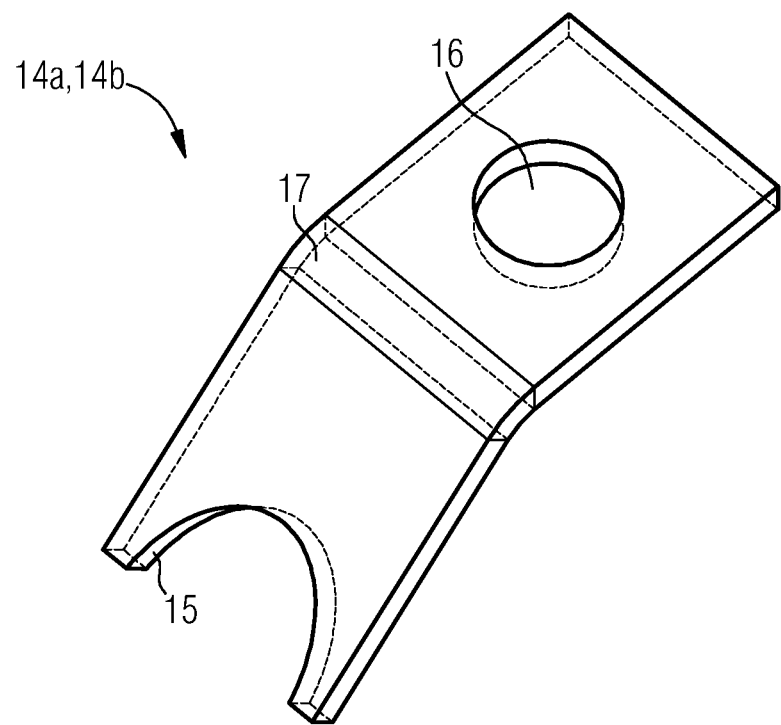

FIGS. 10A and 10B illustrate a collet element 14a, 14b. It is manufactured from a stamped and bent metal sheet, for example. For the metal sheet a material is preferably chosen such that when the optical waveguide is inserted into the body, the collet element 14a, 14b is deformed at most elastically and not plastically. If the collet element 14a, 14b is very stiff, the elastic forces are exerted principally by the elastic body. In this example, the collet element 14a, 14b has a clamping region 15 that presses onto the optical waveguide and thus holds the optical waveguide in the body. The clamping region 15 is fashioned such that the holding forces are as high as possible: a sharp edge in the clamping region 15 can, for example, bring about a deformation of the optical waveguide, preferably exclusively the cladding, or cut slightly into the cladding upon tension and thus improve the holding forces.

Moreover, it is possible for the optical waveguide itself to have a structuring, e.g., undulations or sawteeth, at the connection end to increase the holding forces. An angular section 17 ensures the correct setting angle of the collet on the optical waveguide of approximately 25°-50°. A cutout 16, through which the material of the body can flow during production, ensures the fixing of the collet element 14a, 14b in the body. So that the light guiding function of the optical waveguide is not excessively disturbed, particularly in optical waveguides without cladding, the collet should have only a largely punctiform or linear bearing on the optical waveguide.

FIGS. 11A, 11B and 12A, 12B show schematic illustrations of a collet 14 not provided for encapsulation by injection molding, but rather for insertion into the body of the lighting device as shown in FIGS. 13A, 13B. The collet 14 has a clamping region 15 having a functionality as in the preceding example. In addition, it has a body spring clamp 18. Together with a body undercut 21, it prevents the collet 14 from falling out of the body 10 (see FIGS. 13A, 13B). The undercut should preferably be fashioned such that it is still removable from the mold by virtue of the elasticity of the body material, that is to say that the mold tool for the undercut can be removed after injection molding even in an integral example of the inner mold. The collet 14 furthermore has a cutout configured preferably as an optical waveguide guide 19. In the non-installed state (see FIGS. 11A, 11B), the collet 14 opens easily. This has the effect that the clamping regions 15 of the collet 14 on both sides move apart in the event of a targeted elastic deformation (expansion) of the body and the clamping between optical waveguide and collet is released as a result.

At the same time, the opening process ensures that the body spring clamp 18 remains in the undercut of the body and the collet is thus retained in the body when the optical waveguide is removed. As shown in FIG. 12B, the clamping regions 15 of the collet 14 on both sides can also be provided with cutouts 151 rounded in a manner adapted to the curvature of the optical waveguide to enlarge the clamping zone between optical waveguide and collet 14. In FIGS. 11B, 12B, the edges of the clamping zones of the clamping regions 15 on both sides are oriented substantially perpendicular to the longitudinal axis along which an optical waveguide is inserted. However, the clamping regions 15 of the collet 14 on both sides can also be angular (not illustrated) with respect to the longitudinal axis and in relation to one another such that they at least approximately imitate the corresponding regions of a thread turn. The lighting device can then also be released from the optical waveguide by corresponding screwing movements. The insertion and the clamping of an optical waveguide can however be effected as described above in this variant as well.

Figure 14A:
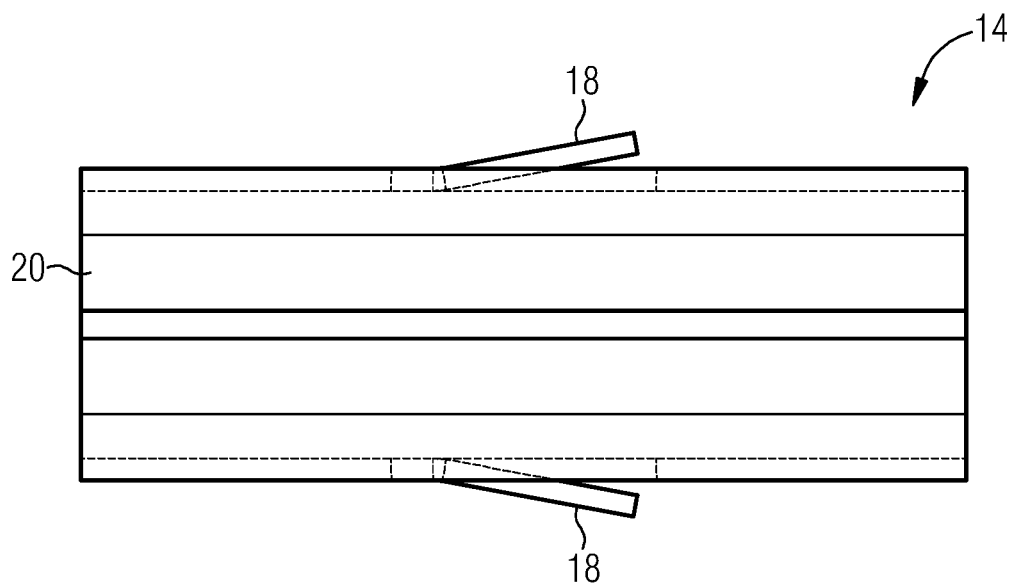
FIGS. 14A, 14B show an optical waveguide sleeve for an optical waveguide in a side view and a perspective view, respectively.
Figure 14B:
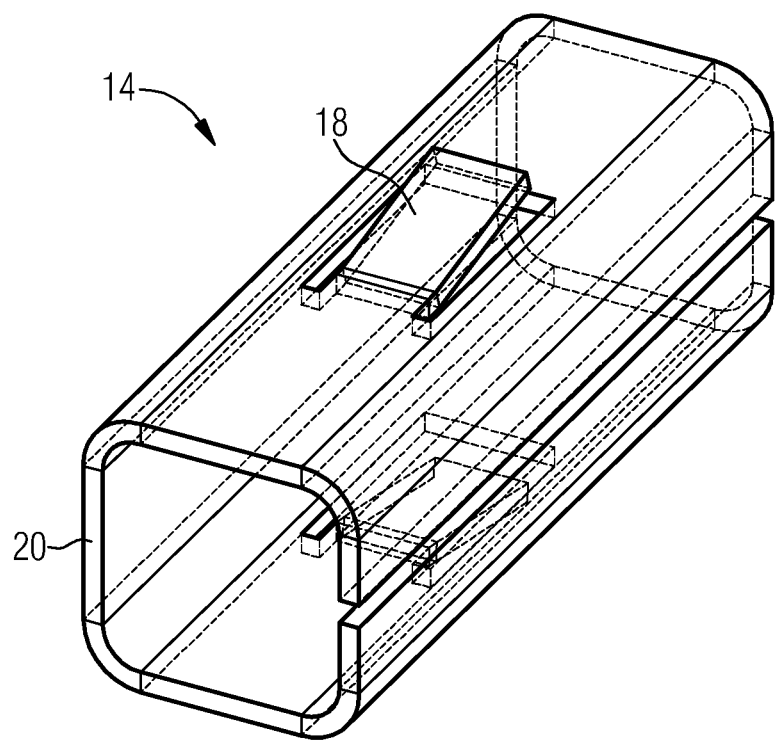
Figure 15B:
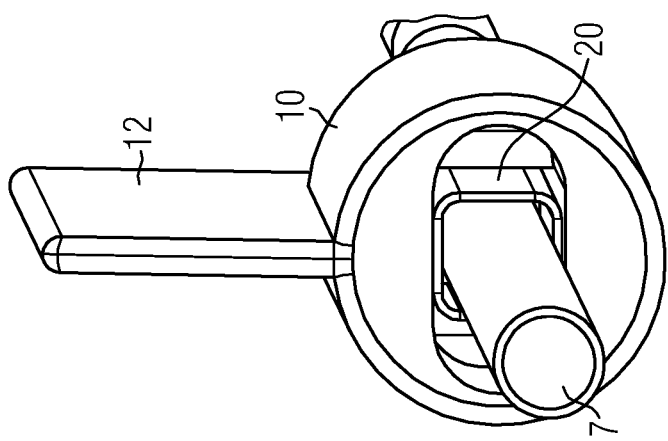
FIGS. 15A, 15B show a schematic illustration of a lighting device with the optical waveguide sleeve shown in FIGS. 14A, 14B in a side view and a front view, respectively.
Figure 15A:
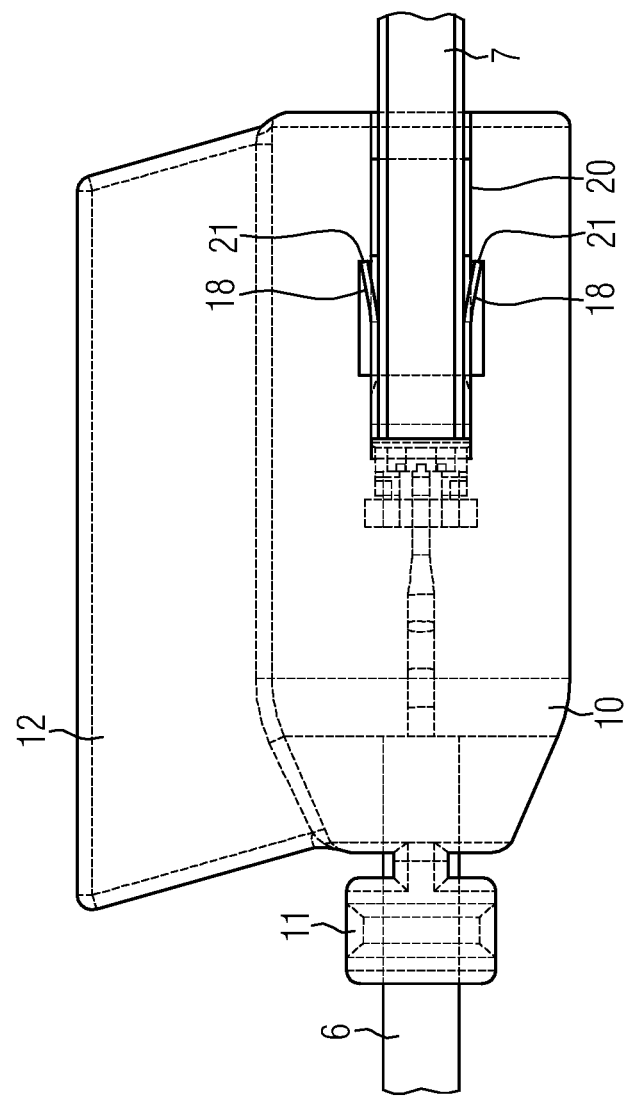

FIGS. 14A, 14B show schematic illustrations of a collet 14 configured as an optical waveguide sleeve 20. The optical waveguide sleeve 20 is mounted on the optical waveguide(s) before the optical waveguide 7 is introduced into the body 10 of the lighting device as shown in FIGS. 15A, 15B. The connection between the optical waveguide 7 and the optical waveguide sleeve can be effected here by clamping, crimping or adhesive bonding. In this example, the geometry of the cross section of the optical waveguide sleeve 20 can be an arbitrary polygon (illustrated here as a quadrilateral) or round. The optical waveguide sleeve again has body spring clamps 18 and the body 10 is provided with associated undercuts 21, both cooperating with the functionality already described further above.

Figure 16A:
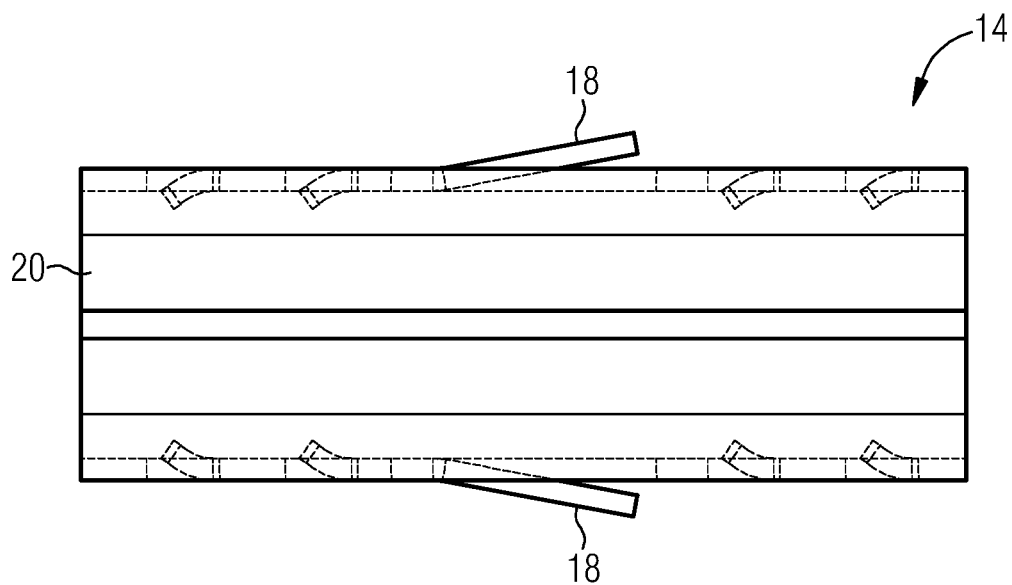
FIGS. 16A, 16B show an alternative example of an optical waveguide sleeve for an optical waveguide in a side view and a perspective view, respectively.
Figure 16B:
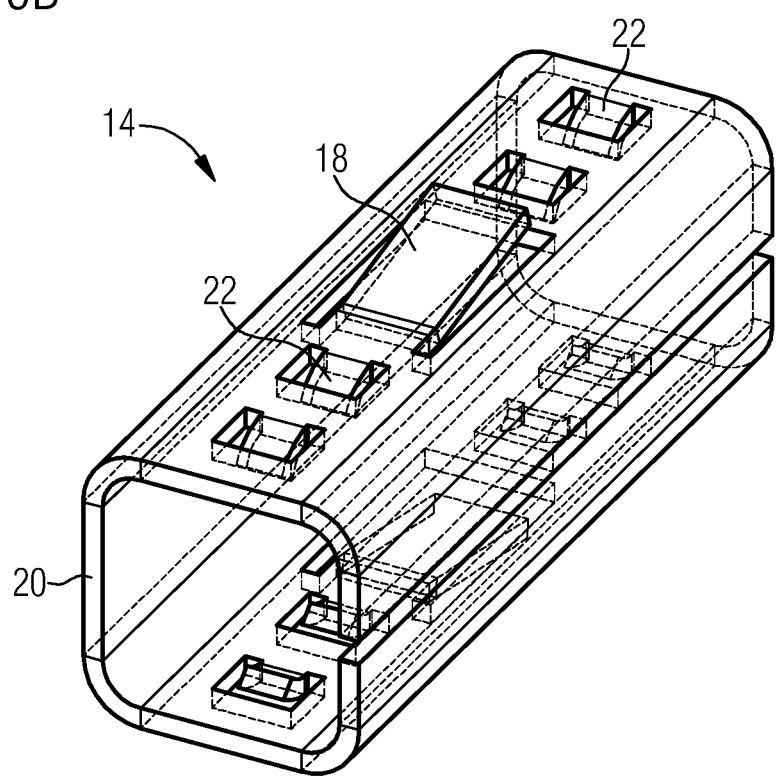
Figure 17B:
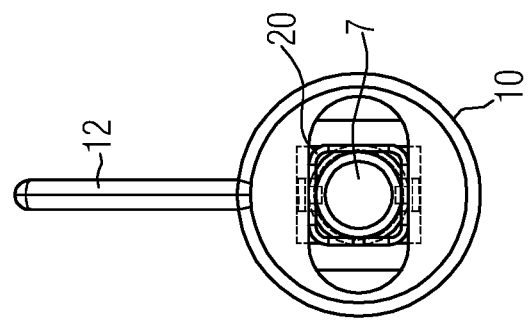
FIGS. 17A, 17B show a schematic illustration of a lighting device with the optical waveguide sleeve shown in FIGS. 16A, 16B in a side view and a front view, respectively.
Figure 17A:
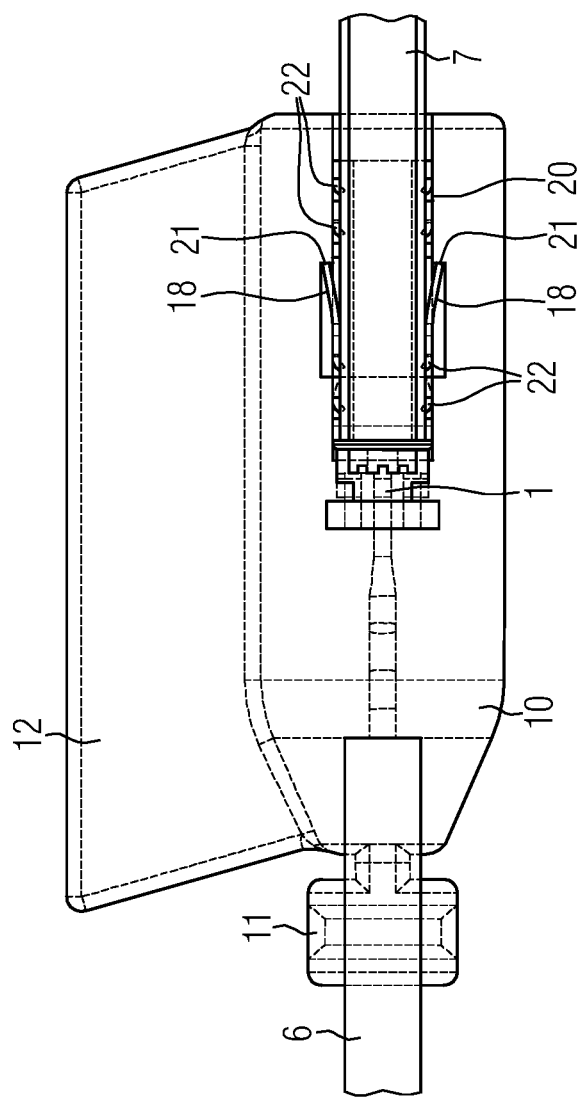

FIGS. 16A, 16B show schematic illustrations of one development of an optical waveguide sleeve 20 with additional defined optical waveguide clamps 22, which press onto the optical waveguide 7 in a sharp-edged manner by way of a defined clamping region and thus hold the optical waveguide in the lighting device as illustrated schematically in FIGS. 17A, 17B.

Figure 18A:
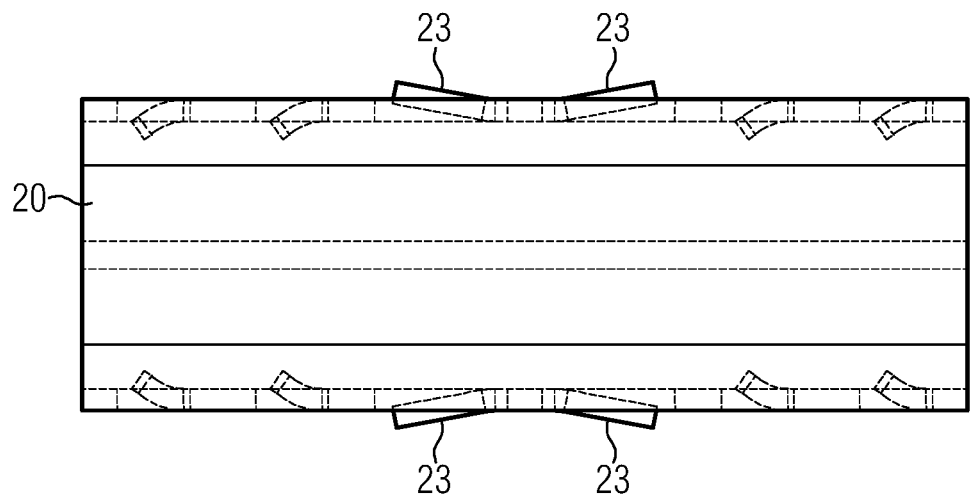
FIGS. 18A, 18B show a further example of an optical waveguide sleeve for an optical waveguide in a side view and a perspective view, respectively.
Figure 18B:
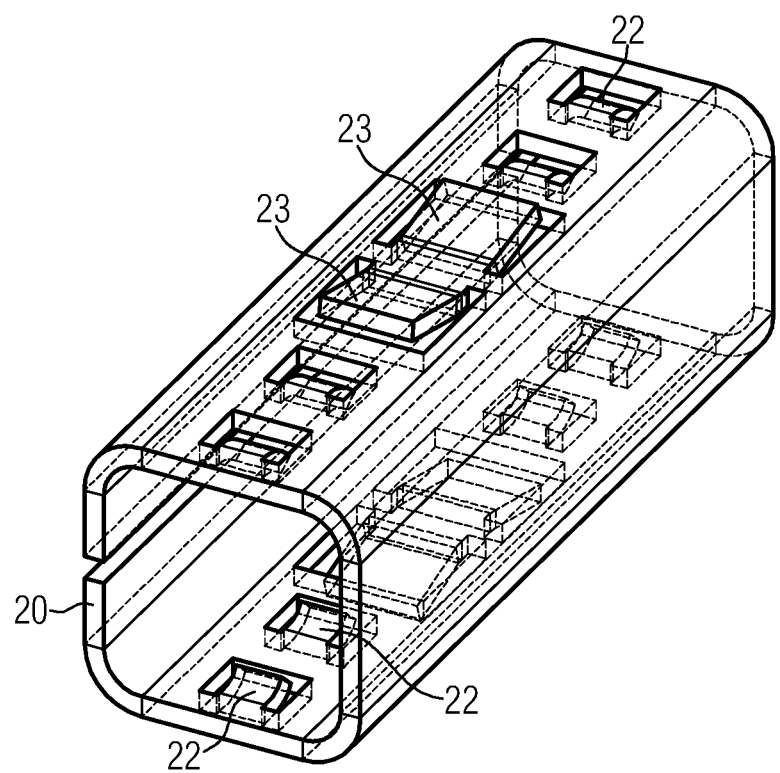
Figure 19A:
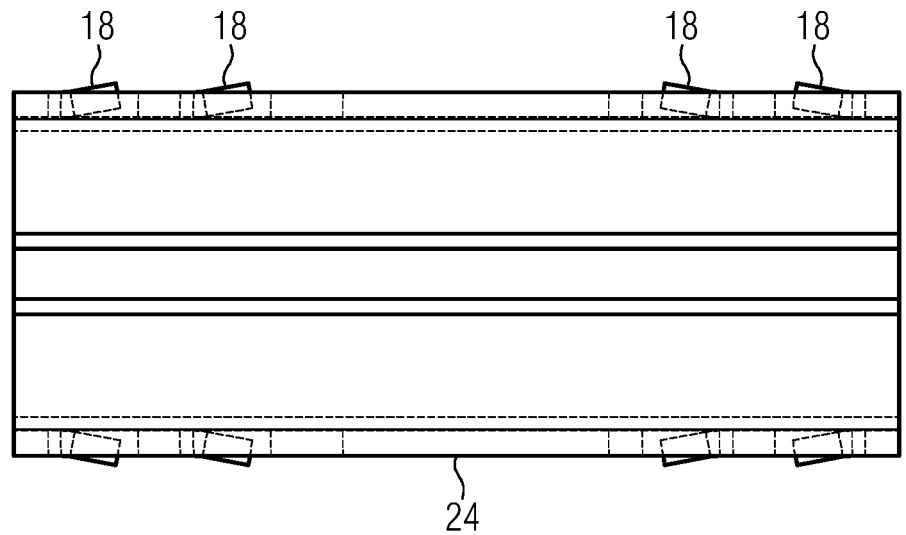
FIGS. 19A, 19B show an inlay sleeve in a side view and a perspective view, respectively.
Figure 19B:
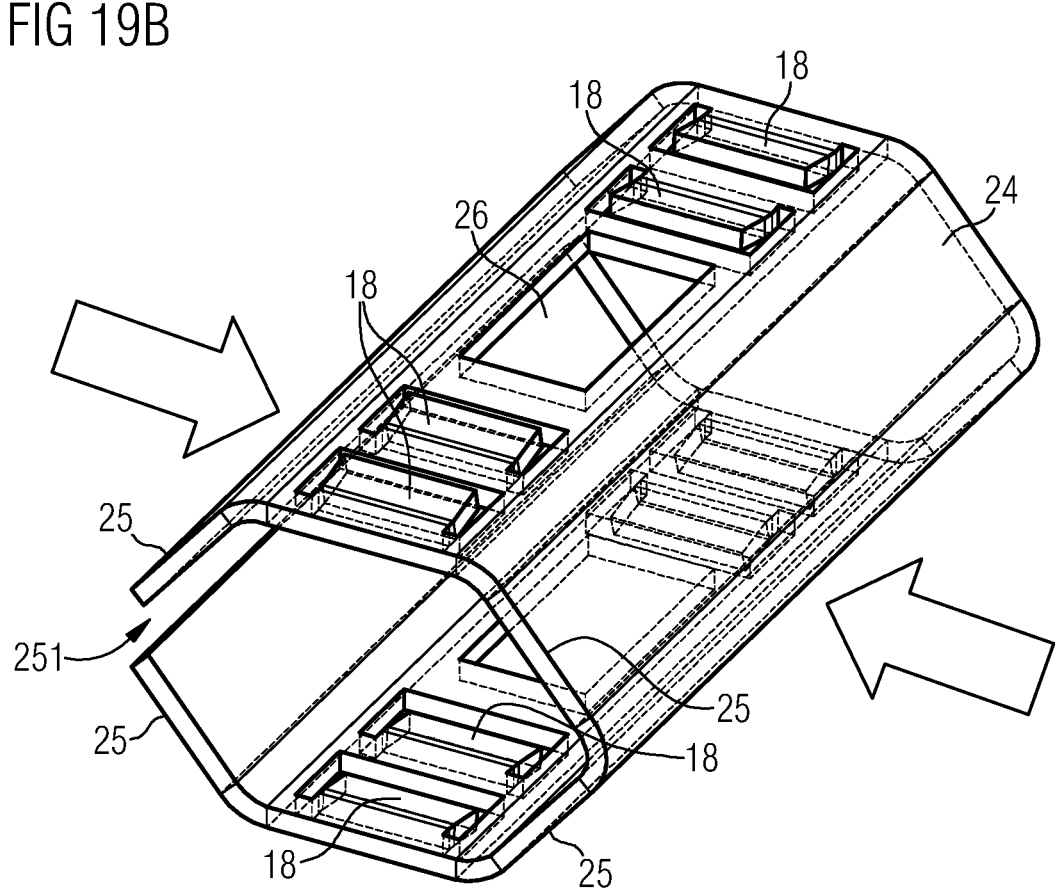
Figure 20:
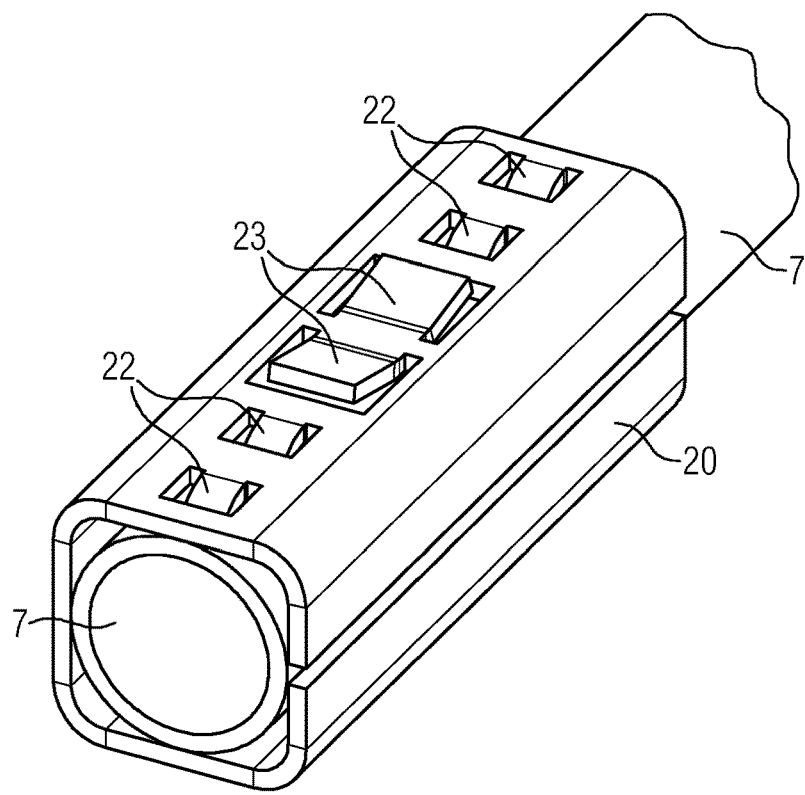
FIG. 20 shows an optical waveguide with attached optical waveguide sleeve in accordance with FIGS. 18A, 18B.

FIGS. 18A, 18B show schematic illustrations of a variant of an optical waveguide sleeve 20 designed for combination with a further sleeve (inlay sleeve). In contrast to the previous examples, this optical waveguide sleeve 20 is not provided for direct clamping with the body of the lighting device. Rather, an inlay sleeve 24 as shown in FIGS. 19A, 19B is introduced into the body, the inlay sleeve receiving the optical waveguide sleeve 20. The optical waveguide sleeve 20 has inlay sleeve stops 23 that position the optical waveguide sleeve 20 in the inlay sleeve 24. Moreover, the optical waveguide sleeve 20 has optical waveguide clamps 22 that clamp the optical waveguide sleeve 20 on the optical waveguide 7 as shown in FIG. 20.

Figure 21:
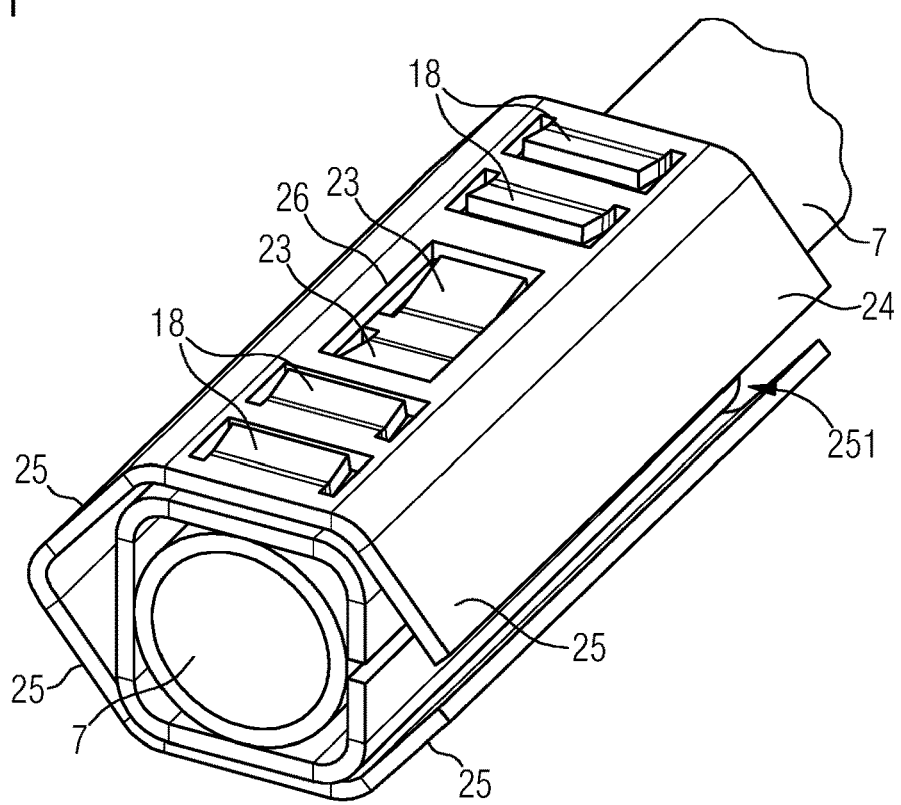
FIG. 21 shows the device of FIG. 20, but additionally with attached inlay sleeve.
Figure 22A:
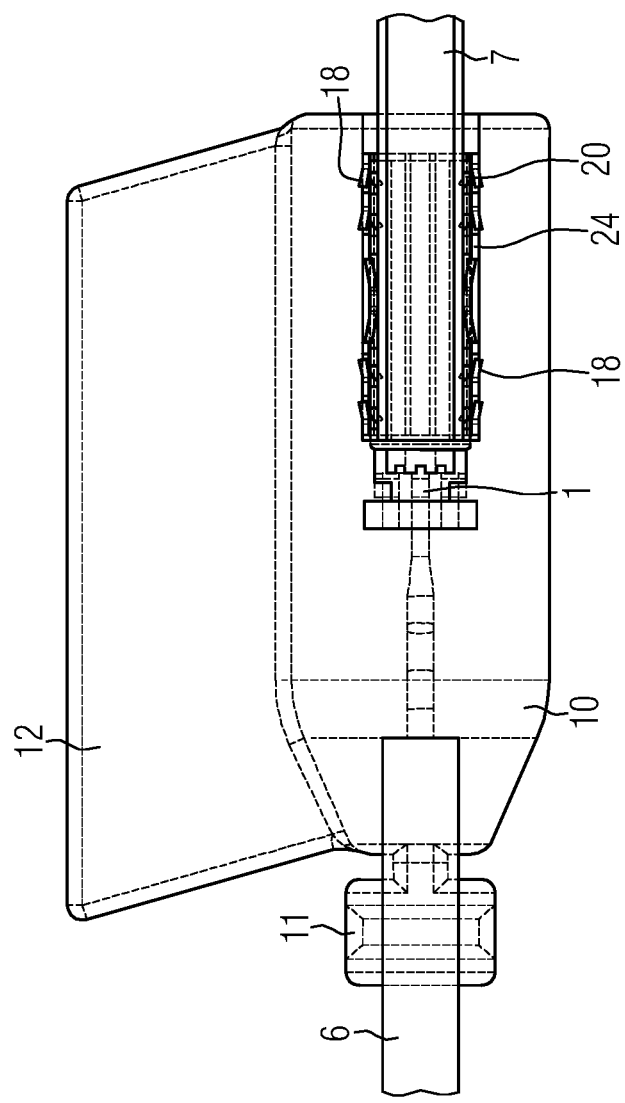
FIGS. 22A, 22B show a schematic illustration of a lighting device with the optical waveguide sleeve and inlay sleeve shown in FIGS. 20 and 21, respectively, in a side view and a front view, respectively.
Figure 22B:
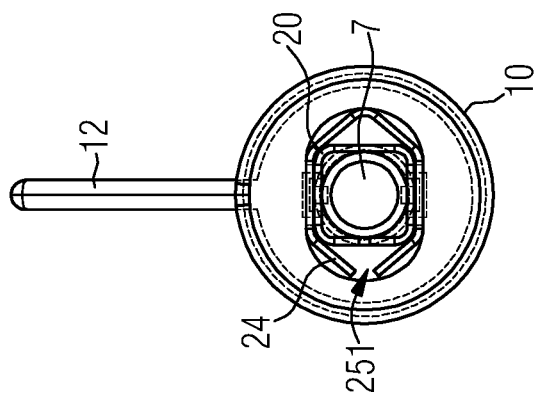
Figure 23:
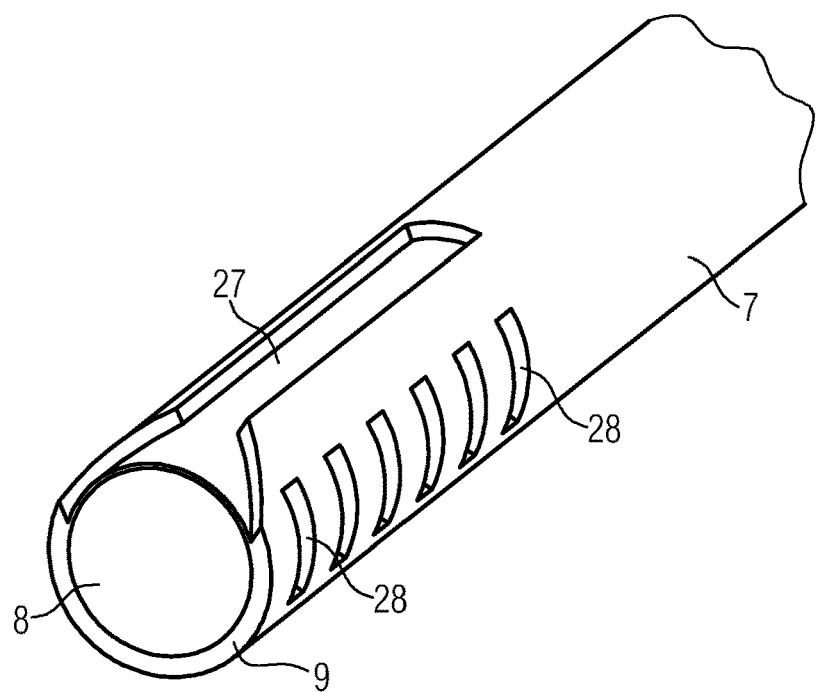
FIG. 23 shows an optical waveguide with a structured cladding.

FIGS. 19A, 19B show schematic illustrations of the inlay sleeve 24 having an inlay sleeve stop cutout 26 that receives the inlay sleeve stops 23 as shown in FIG. 21. Moreover, the inlay sleeve 24 has body spring clamps 18 that clamp the inlay sleeve 24 with the body 10 of the lighting device as shown in FIG. 22A. Moreover, the inlay sleeve 24 has two angled inlay sleeve legs 25 situated opposite one another, which, upon external pressure on both sides (symbolized by the two arrows in FIG. 19B), cause the inlay sleeve cutout 26 to lift off from the inlay sleeve stops 23 and thus enable the optical waveguide 7 with the optical waveguide sleeve 20 to be released from the inlay sleeve 24 as shown in FIG. 22A in conjunction with FIG. 22B. In addition, the inlay sleeve 24 is provided with a slot 251 along the abutting edge of one of the two legs 25, which slot enables the spring effect to be set and facilitates the insertion of the inlay sleeve 24. The inlay sleeve 24 is held in the body 20 by the body spring clamps 18. The body can also have corresponding undercuts as explained further above (not illustrated).

Figure 24:
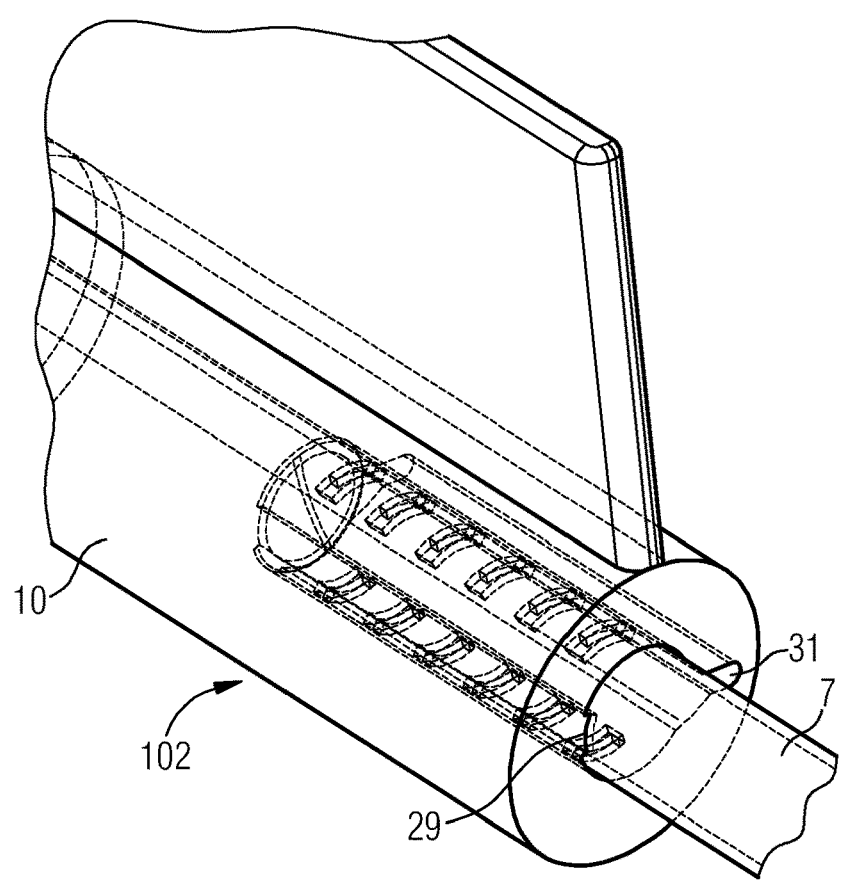
FIG. 24 shows a schematic illustration of a lighting device with the optical waveguide shown in FIG. 23 in a perspective view.
Figure 25:
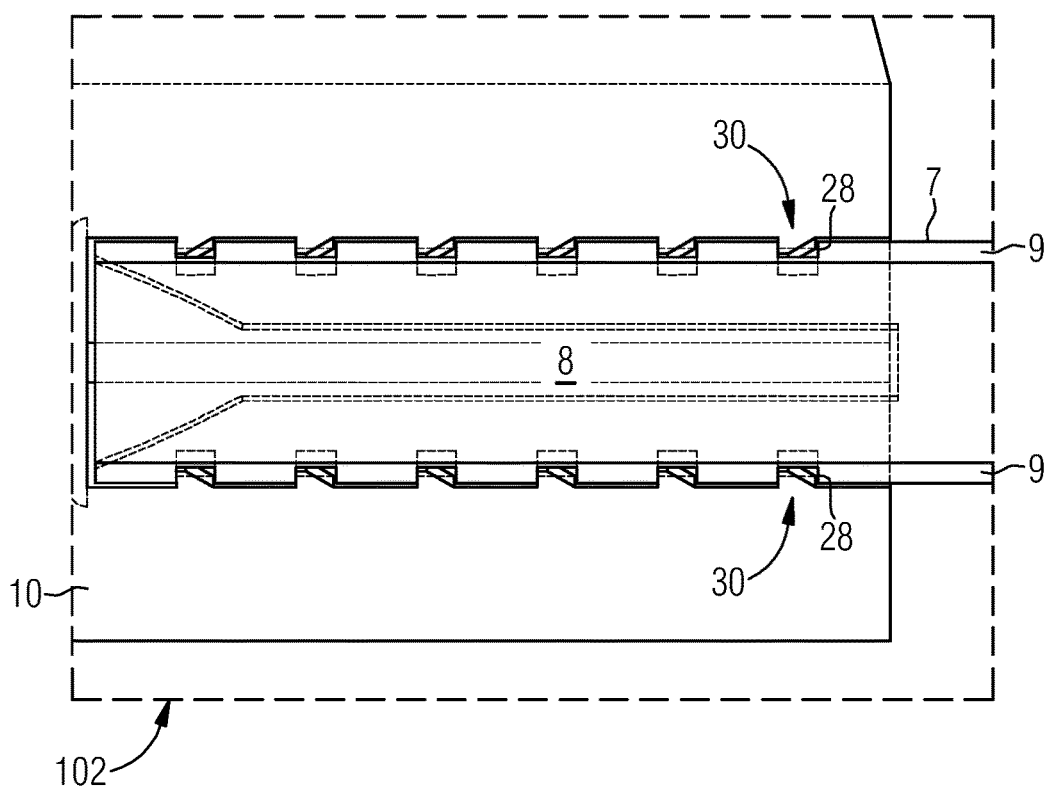
FIG. 25 shows a schematic illustration of an excerpt from the clamping section of the lighting device in accordance with FIG. 24.
Figure 26:
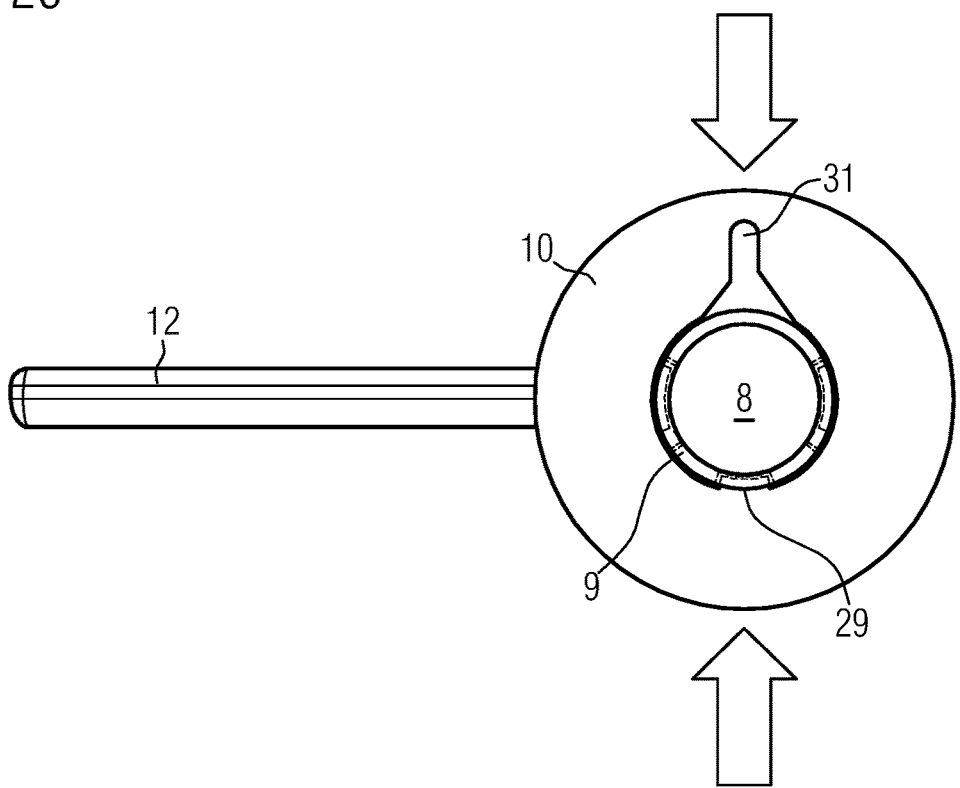
FIG. 26 shows a front view of the lighting device illustrated in FIG. 24.

FIGS. 23 to 26 schematically illustrate a lighting device with an optical waveguide 7 in accordance with a further example. Here, the collet is integrated into the body in the form of body catches 30 as shown in FIG. 25. To be able to generate sufficient extraction forces on the opposite side of the optical waveguide 7, two rows of grid grooves 28 situated opposite one another are introduced on the surface of the optical waveguide 7, in the cladding 9 in the example shown in FIG. 23. To facilitate bringing together optical waveguide 7 and body 10 in a defined manner, the optical waveguide 7 has a guide groove 27 between the two rows of grid grooves 28. The body 10 has a matching guide web 29 in the clamping section 102. It is only upon correct orientation of optical waveguide 7 and lighting device that the optical waveguide 7 can be inserted and the body catches 30 can engage into the grid grooves 28. FIG. 24 shows a schematic illustration of this lighting device with inserted optical waveguide 7. FIG. 25 shows a longitudinal sectional view of the clamping section 102 of the lighting device in a schematic illustration, which reveals in detail how the body catches 30 of the body 10 engage into the grid grooves 28 of the cladding 9 of the optical waveguide 7. An expanding groove 31 in the body 10 (see FIGS. 24 and 26) makes it possible that the body catches can lift off from the grid grooves upon targeted external force action as a result of pressure on both sides along the expanding groove 31 (symbolized by the two arrows in FIG. 26).

We provide a lighting device for the illumination of textiles by optical waveguides, which lighting device comprises a clamping device that repeatedly releasably clamps the optical waveguide. In this example, the clamping device is designed such that the optical waveguide is clamped by inherent forces, in particular elastic forces or spring forces. By a targeted force action on the clamping device, for example, an elastic shape change, in particular elastic expansion of the body of the lighting device or the clamping device counter to the direction of the clamping force, the clamping is released and the optical waveguide can be removed from the clamping device. Afterward, as necessary the optical waveguide can again be inserted into the lighting device and be repeatedly releasably clamped therein with the aid of the clamping device.

The invention claimed is:

1. A lighting device that illuminates textiles by optical waveguides comprising:
   a body that receives the optical waveguide;
   a clamping device having clamping elements that in a rest state contact the optical waveguide and exert a clamping effect thereon; and
   a lighting module,
   wherein the lighting module is arranged within the body to enable light emitted by the lighting module during operation to be coupled into the optical waveguide, and
   the clamping device is adapted 1) to repeatedly clamp and release the optical waveguide, and 2) such that upon targeted external force action the clamping elements lift off from the optical waveguide as a result of which the clamping effect is released.

2. The lighting device as claimed in claim 1, wherein the clamping device and/or the body themselves/itself apply the force for the clamping of the optical waveguide.

3. The lighting device as claimed in claim 1, wherein the body and/or the clamping device at least partly consist(s) of an elastic or resilient material.

4. The lighting device as claimed in claim 1, wherein the clamping device is adapted such that the clamping effect is releasable by targeted external force action.

5. The lighting device as claimed in claim 1, wherein the body and/or the clamping device are/is at least partly shaped such that the targeted external force action brings about an elastic shape change which lifts off the clamping elements from the optical waveguide and thereby cancels the clamping effect.

6. The lighting device as claimed in claim 5, wherein the shape change necessary to lift off the clamping elements is facilitated by an expanding groove in the body.

7. The lighting device as claimed in claim 1, wherein the clamping device has a collet having at least two collet elements situated opposite one another.

8. The lighting device as claimed in claim 1, wherein the clamping device is at least partly an integral part of the body.

9. The lighting device as claimed in claim 8, wherein the body has in a clamping section a structure that clampingly cooperates with a structure of a component arranged on the optical waveguide.

10. The lighting device as claimed in claim 1, wherein the clamping device is a combination of two repeatedly releasably clamping components, and one component is connectable to the optical waveguide and the other component is connectable to the body.

11. The lighting device as claimed in claim 10, wherein the two components are configured as repeatedly releasably clamping sleeves that fit into one another coaxially, and the sleeves are provided with intermeshing structures for a high-tensile-strength interlacing of both sleeves in the axial direction.

12. The lighting device as claimed in claim 11, wherein the outer sleeve is shaped in cross section such that it lifts off from the inner sleeve as a result of targeted force action at least in a region of the interlacing and thus enables both sleeves to be axially released from one another.

13. The lighting device as claimed in claim 1, wherein the body has a securing element that secures to a textile or a sew-on strap for sewing the lighting device to a textile or a button, snap fastener or a buttonhole or a hook and loop tape.

14. A textile comprising the lighting device as claimed in claim 1.

15. A method of repeatedly clamping and releasing an optical waveguide in a lighting device comprising:
   a body that receives the optical waveguide;
   a clamping device for the optical waveguide; and
   a lighting module,
   wherein the lighting module is arranged within the body to enable light emitted by the lighting module during operation to be coupled into the optical waveguide, and
   the clamping device is adapted to repeatedly clamp and release the optical waveguide, the method comprising:

inserting the optical waveguide into the body of the lighting device, whereupon the clamping device clamps the optical waveguide with the aid of the clamping elements and inherent forces acting thereon; and applying an external force action to the body of the lighting device in a targeted manner such that the clamping elements are released and free the optical waveguide.

16. A lighting device that illuminates textiles by optical waveguides comprising:
   a body that receives the optical waveguide;
   a clamping device for the optical waveguide; and
   a lighting module,
   wherein the lighting module is arranged within the body to enable light emitted by the lighting module during operation to be coupled into the optical waveguide,
   the clamping device is adapted to repeatedly clamp and release the optical waveguide,
   the clamping device is a combination of two repeatedly releasably clamping components, and one component is connectable to the optical waveguide and the other component is connectable to the body; and
   the two components are configured as repeatedly releasably clamping sleeves that fit into one another coaxially, and the sleeves are provided with intermeshing structures for a high-tensile-strength interlacing of both sleeves in the axial direction.

17. The lighting device as claimed in claim 16, wherein the outer sleeve is shaped in cross section such that it lifts off from the inner sleeve as a result of targeted force action at least in a region of the interlacing and thus enables both sleeves to be axially released from one another.

\* \* \* \* \*